(12) United States Patent
Hsu

(10) Patent No.: US 6,734,432 B2
(45) Date of Patent: May 11, 2004

(54) PORTABLE UV DETECTOR WITH SIMPLE OPERATION

(76) Inventor: Shui-Ching Hsu, No. 541, Sec. 2, Tai-Lin. Rd., Tai-Shan Hsiang, Taipei Hsien (TW)

(*) Notice: Subject to any disclaimer, the term of this patent is extended or adjusted under 35 U.S.C. 154(b) by 180 days.

(21) Appl. No.: 10/084,951

(22) Filed: Mar. 1, 2002

(65) Prior Publication Data

US 2003/0164454 A1 Sep. 4, 2003

(51) Int. Cl.⁷ .................................................. G01J 5/04
(52) U.S. Cl. ..................................................... 250/372
(58) Field of Search ......................................... 250/372

(56) References Cited

U.S. PATENT DOCUMENTS

| 4,704,535 A | * | 11/1987 | Leber et al. ................. 250/372 |
| 5,382,799 A | * | 1/1995 | May ............................. 250/372 |
| 6,348,694 B1 | * | 2/2002 | Gershteyn et al. ........... 250/372 |

* cited by examiner

*Primary Examiner*—Constantine Hannaher
(74) *Attorney, Agent, or Firm*—Rosenberg, Klein & Lee

(57) ABSTRACT

A portable UV detector is provided having a printed circuit board, a display module and multiple batteries housed in a cylindrical body. A display panel window is located on the external wall of the cylindrical body to mount the display module with an appropriate UV level indicator. A light detector located underneath the filtering lens is enabled at the push of a button to measure the intensity of incoming UV light and display a corresponding level on the display module.

3 Claims, 3 Drawing Sheets

PORTABLE UV DETECTOR WITH SIMPLE OPERATION

BACKGROUND OF THE INVENTION

1. Field of the Invention

The present invention relates to a simple-to-use ultraviolet radiation (UV) detector, in particular, a portable apparatus that can provide instant feedback of the UV radiation level in an outdoor environment.

2. Description of Related Art

With the advancement of technology and industry, people start to ponder the impact on our environment and us. Without question, the rapid development in high tech industries has provided us with many modern conveniences, but we have also paid a price for these conveniences. For example, the ozone layer used to provide an important function by filters out harmful ultraviolet radiation from the sun. However, scientists discovered that fluorocarbons have caused a hole in the ozone layer in our atmosphere over the Antarctic region. Since ultraviolet radiation is invisible to us, many people have taken the natural protection of the ozone layer for granted. Therefore, the news that the ozone layer is being depleted came as a shock to many people.

In the past, the ozone layer absorbed most of the ultraviolet radiation transmitted to the Earth from the sun, so that only a very small portion get through the atmosphere to the surface of the earth. The potent hazards of UV radiation to living creatures on earth were not very significant, at least not obvious in our daily life.

However, the fact that a part of the ozone layer has been depleted to the extent that a hole exists suggests that the ozone layer surrounding our planet has become thinner. Continued depletion of the ozone layer could cause considerable harm to human beings as well as other living creatures if no action is taken to control the situation. A human body severely exposed to ultraviolet radiation may undergo pathological changes. It is known that some species originally relying on the natural protection against harmful ultraviolet radiation are gradually diminishing. Living creatures on this planet exposed to excessive ultraviolet radiation may be subject to maladies. If the situation is not corrected, some of the species on this planet will be faced with extinction before long.

Destruction of the ozone layer has long been a concern of environmental organizations, and legislation has been enacted to ban the use of ozone-damaging refrigerants in all countries. Despite the legislative efforts all over the world, the hole in the ozone layer has not been mended and is slowly growing in size. If this situation is not corrected, the UV radiation emancipated from the sun through the hole in the ozone layer or the damaged layer is likely to cause skin maladies due to prolonged exposure. Over exposure to UV radiation can cause skin tumors.

Since the excessive exposure to UV radiation has proven to be detrimental to our health, the news media has begun reporting the UV radiation levels in daily weather forecast to provide viewers with some idea of the UV radiation level. However, this kind of forecast information from the news media at best only serves as a general reference. People participating in outdoor activities do not know what precautionary measures to take to protect their skin against UV radiation, because they do not have current information about the UV radiation level in their specification location. Generally, a set of UV detection equipment is very expensive and requires a large space for installation thereby making it impractical for individuals.

Nevertheless, UV radiation is a potent health hazard for those people constantly working in an outdoor environment. It is necessary to produce a simple device that can measure the UV radiation level, and can satisfy consumer needs and be economical at the same time.

SUMMARY OF THE INVENTION

The present invention provides a portable apparatus that can be operated with simple procedures to measure the UV radiation level in an outdoor environment. This UV detector includes a main body, a filtering lens, a display module, a printed circuit board, a light detector and multiple batteries.

The main body has an external wall and two ends with a hollow core running through both ends. The filtering lens is mounted on one end of the main body, and a screw plug is mounted on the other end. An enclosed chamber is formed behind the plug to accommodate multiple batteries. A window is formed through the external wall of the main body in which the display module is mounted.

An output conversion circuit on the printed circuit board has an input terminal connected to the light detector mounted underneath the filtering lens and an output terminal connected to the display module mounted in the display panel window in the main body.

The batteries supply the operating voltage for the output conversion circuit and the light detector.

A user of the UV detector only has to orient the filtering lens towards the sky or in the direction of the sun so the light detector can be measure the intensity of light ray. The output conversion circuit converts the measured voltage to a reading scale corresponding to the UV radiation level for display to the user through the display module. Consumers are able to carry the UV detector wherever they go and obtain an instantaneous reading of the UV radiation level in any outdoor environment.

The printed circuit board in accordance with the present invention comprises a push-button switch, a light detection circuit, a comparator circuit and a power switch circuit.

The push-button switch is mounted in a hole appropriately located on the external wall of the main body to control the action of the output conversion circuit and the light detector.

The light detection circuit is composed of multiple resistors and a photo resistor. The resistors form a voltage divider circuit so that a reference voltage is produced at each voltage tapping junction, and the photo resistor is used to form the light detector.

The comparator circuit is formed by multiple comparators. The reference voltage terminal of each comparator is respectively connected to the voltage tapping junction to receive a reference voltage. The input terminal of each comparator is connected to a resistor with a different resistance for voltage detection. The output terminals of these comparators are respectively connected to the corresponding pins of the display module to control the illumination of the lowest display segment on the display module.

The power switch circuit on the printed circuit board is formed by the push-button switch and the batteries in series, adapted to control the operating voltage of the light detection circuit, comparator circuit and display module.

When the push-button switch turns on the battery power, the light detection circuit starts to measure the intensity of incoming light. A measured voltage value is output to the comparator circuit for comparison with the voltage setting values of individual comparators. The result of such comparison is used to determine the number of display segments to be illuminated. The number of display segment illuminated corresponds to the UV radiation level.

Two ends of the push-button switch and the battery in series are connected by a resistor and a Zener diode in parallel at a specified junction. The junction in turn is linked to one of the input pins of the display module to control the illumination of the lowest display segment.

Other objectives, advantages, and novel features of the invention will become apparent from the detailed description when taken in conjunction with the attached drawings.

DETAILED DESCRIPTION OF THE PREFERRED EMBODIMENT

Figure 1:
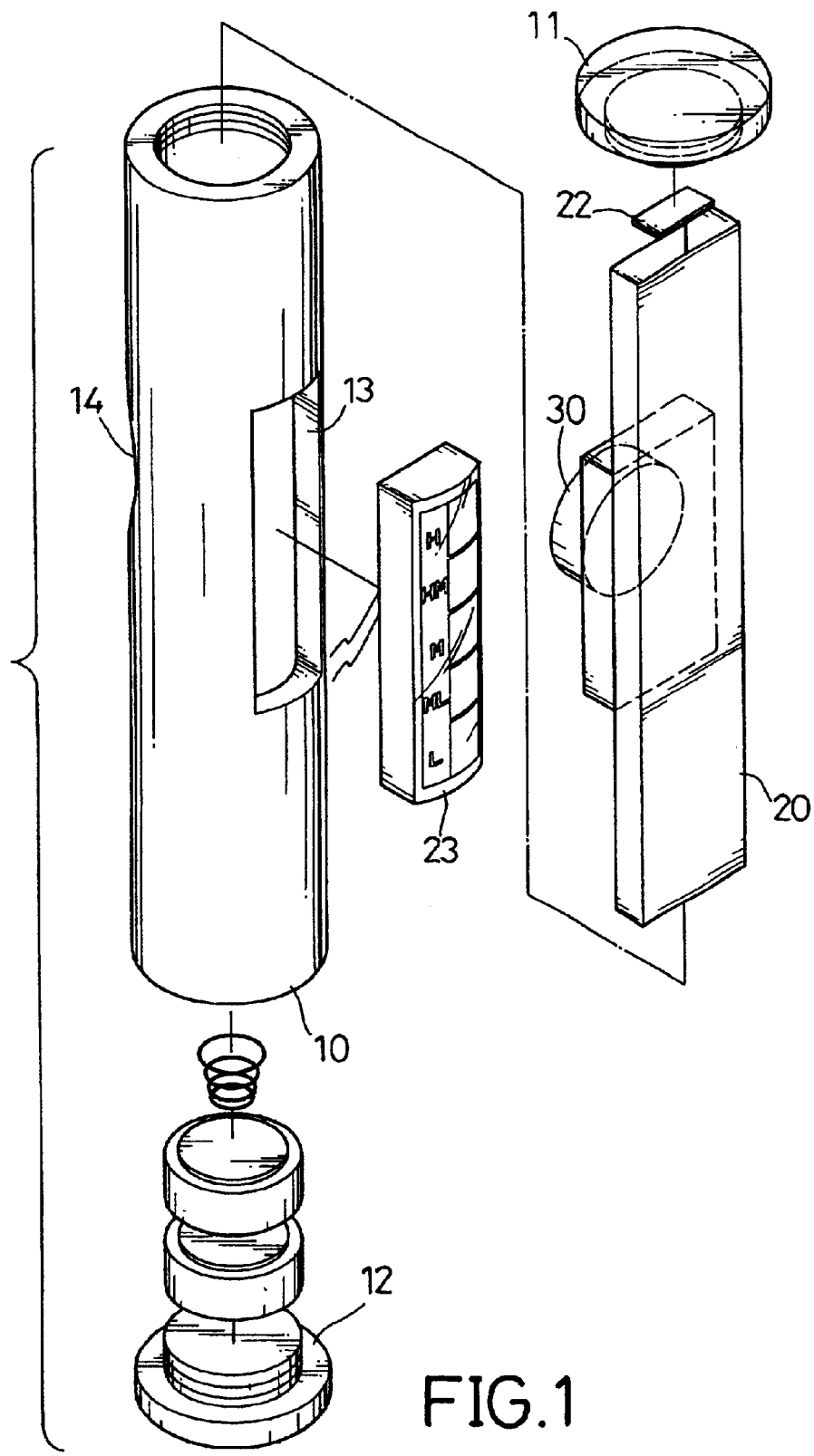
FIG. 1 is an exploded perspective view of a portable UV detector in accordance with the present invention.
Figure 2:
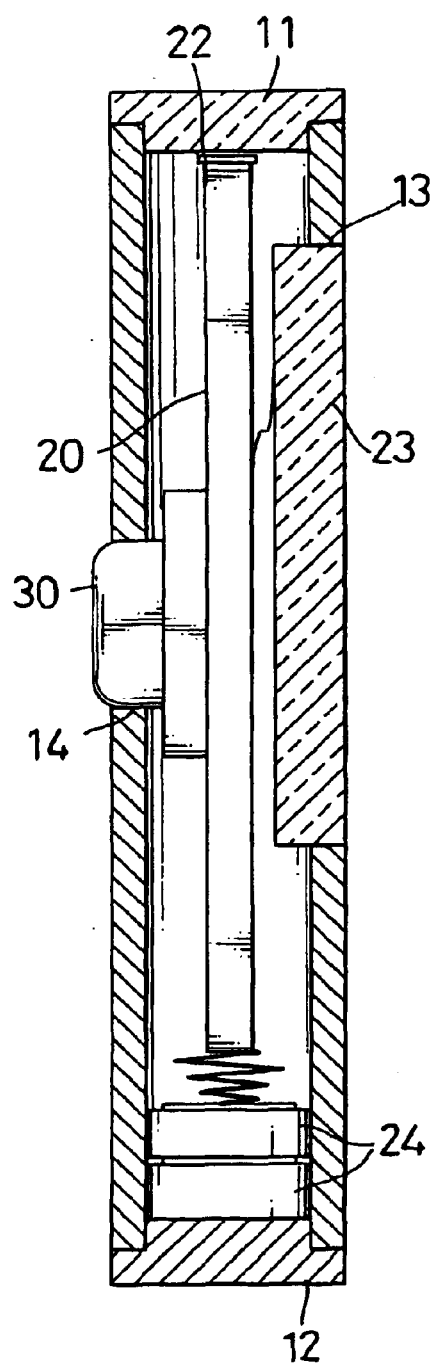
FIG. 2 is a cross-sectional side plan view of the portable UV detector in FIG. 1.

With reference to FIGS. 1 and 2, the UV detector presented in the invention comprises a main body (10), a filtering lens (11), a display module (23), a printed circuit board, a light detector (22) and multiple batteries (24).

The main body (10) has an external wall (not numbered) and two ends (not numbered) with a hollow core running through both ends. The filtering lens (11) is mounted on one end to filter out all components of light except the ultraviolet radiation. A screw plug (12) is attached to the other end and an enclosed chamber (not numbered) is defined inside the main body (10). Multiple batteries (24) are installed in the enclosed chamber behind the plug. A display panel window (13) is formed through the external wall in the main body (10). A through hole (14) is formed through the external wall of the main body (10) diametrically opposite from the position of the display panel window (13). A push-button (30) is mounted in the through hole (14).

Figure 3:
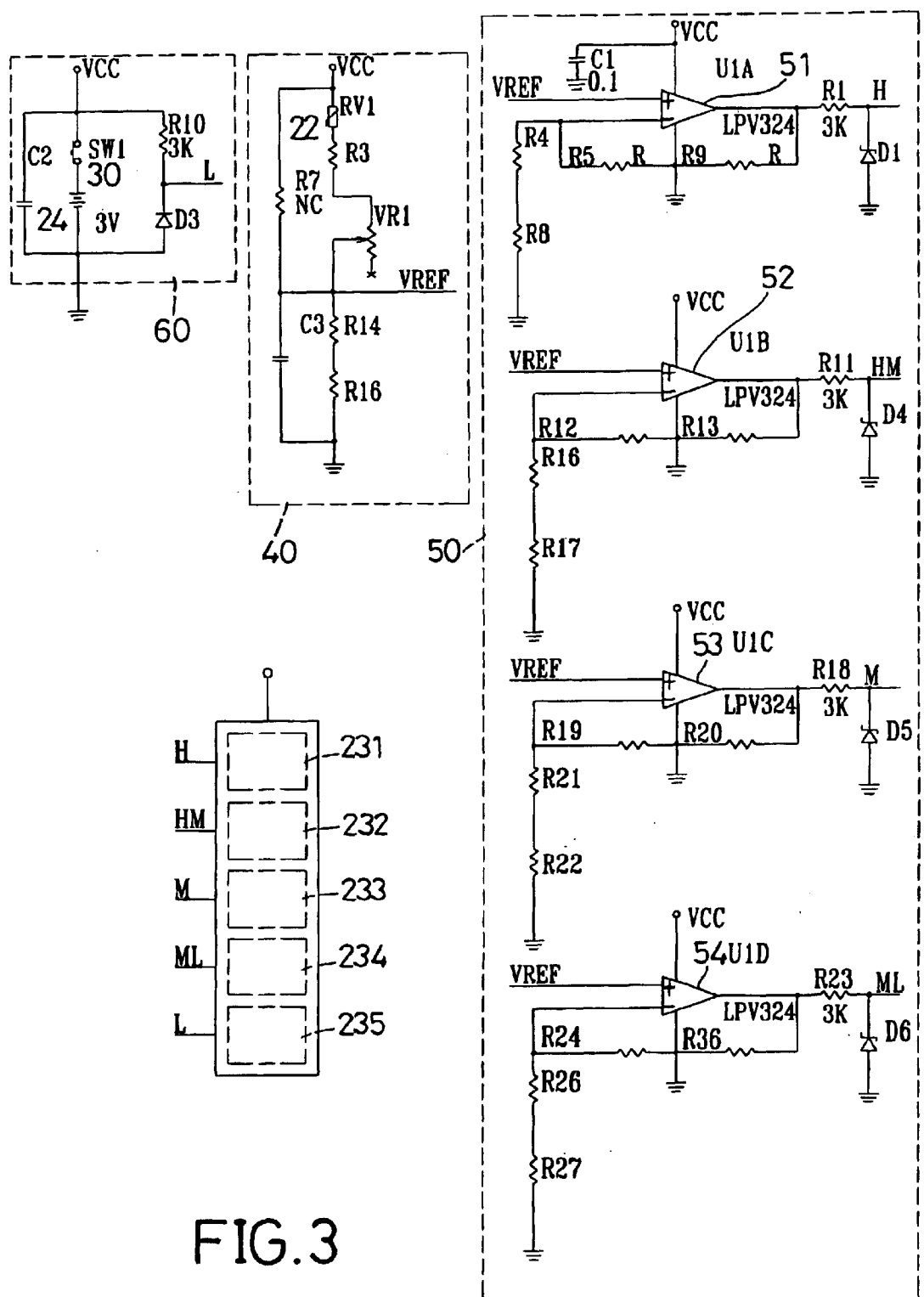
FIG. 3 is a circuit diagram of the circuitry in the portable UV detector in FIG. 1.

The display module (23) is mounted in the display panel window (13) through the wall of the main body (10). The display module (23) can display either a numerical or graphical format. In the present embodiment a graphical display is described. With further reference to FIG. 3, the display module (23) comprises an array of five display segments (231–235) and a UV level scale (not numbered) printed along one side of the display module (23) to refer to the UV radiation level. The UV radiation level is represented by the number of display segments (231–234) illuminated.

An output conversion circuit is on the printed circuit board (20). The input terminal is connected to the light detector (22), located on one end of the main body (10) just underneath the filtering lens (11); and the output terminal of the output conversion circuit is connected to the display module (23) in the main body (10);

With reference to FIG. 3, the actual design of the output conversion circuit comprises a push-button switch, a light detection circuit (40), a comparator circuit and a power switch circuit.

The light detection circuit (40) is composed of multiple resistors (VR1, R14, and R15) and a photo resistor (RV1). The resistors (VR1, R14, and R15) are used to form a voltage divider circuit such that a reference voltage (VREF) is produced at a voltage tapping junction, and the photo resistor RV1 forms the light detector (22).

The comparator circuit (50) is formed by multiple comparators (51–54). The reference voltage terminal of each is respectively connected to the voltage tapping junction of the light detection circuit (40) to receive the respective reference voltage (VREF). The input terminals of the comparators (51–54) are connected to a resistor of a different resistance value for voltage detection. The output terminals of the comparators (51–54) are respectively connected to the corresponding input pins of the display module (23) to control the illumination of the corresponding display segments (231–234).

The power switch circuit (60) with the push-button switch (30) and the battery (24) connected in series controls the operating voltage (Vcc) of the light detection circuit (40), the comparator circuit (50) and the display module (23). The ends of the series combination of push-button switch (30) and battery (24) are connected to a resistor (R10) and a Zener diode (D3) connected in series with a junction L therebetween, in turn is connected to one of the pin (L) of the display module (23) to control the illumination of the fifth display segment (235).

When the push-button switch (30) turns on the battery (24), power is connected to the display module (23). A high potential is output by the power switch circuit (60) to illuminate the fifth display segment (235). The light detection circuit (40) starts to test and measure the incoming light. A measured voltage value is then output to the comparators (51–54) of the comparator circuit (50) for comparison with the individual voltage settings to determine the number of display segments (231–234) to be illuminated. The number of display segments (231–234) illuminated represents the corresponding UV radiation level. The input terminals of the comparators (51–54) are respectively preset with different voltage values. When the voltage setting is below the reference voltage value, a high potential is output from the output terminal to the corresponding pins of the display module (23) to cause the corresponding display segment (231–234) to be illuminated. Since the number of display segments (231–234) illuminated is proportional to the UV radiation level measured, a user can easily understand the reading scale of UV radiation displayed by the UV detector.

Figure 4:
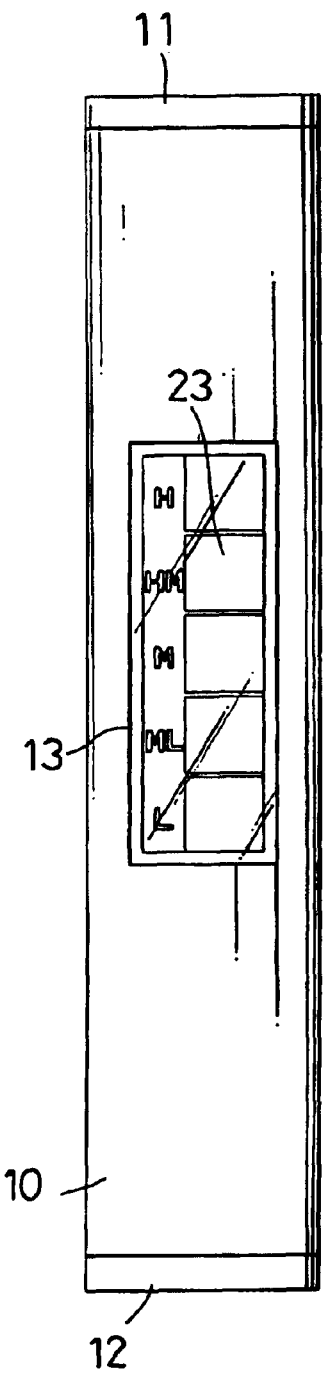
FIG. 4 is an operational front plan view of the portable UV detector in FIG. 1.

When a user wants to find out the UV radiation level in an outdoor environment, he or she only has to turn the filtering lens (11) in the main body (10) toward the sun, so that sunlight comes in through the filtering lens (11). The filtering lens (11) filters out all light components except the ultraviolet radiation. The remaining light is received by the light detector (22) that measures the intensity of ultraviolet radiation. The measured voltage value through the voltage conversion is converted to a display format in terms of numbers of display segments corresponding to the UV radiation level. The operation status is displayed through the display segments (231–235) shown in FIG. 4. The number of display segments turned on is dependent on the intensity of UV radiation measured. A user can easily understand the UV reading scale in conjunction with the level indication along one side of the display segments used to interpret the intensity of UV radiation. The consumer accordingly can take appropriate measures to protect his or her skin against UV radiation.

The present invention has incorporated many novel features:

(1) Easy to use: The operation of the portable UV detector is controlled by a push button switch (30) conveniently located on the main body (10), and the detector is set up for operation with a simple adjustment of the filtering lens (11).

(2) Miniaturized body: The streamlined body is used to house the light detector (22), circuit board (20), battery (24) and display module (23).

(3) Easy readout: The display is adapted with a reading scale corresponding to the UV radiation level, so that a user is able to obtain an instantaneous reading with respect to the UV radiation in any outdoor environment.

The foregoing illustration of the preferred embodiments in the present invention is intended to be illustrative only. Under no circumstances should the scope of the present invention be so restricted.

What is claimed is:

1. A portable UV detector with simple operation comprising:

a cylindrically shaped main body having a through bore extending between opposing ends of the main body, the main body having a display window formed through one side portion thereof and in open communication with the through bore, a through opening formed in a side portion displaced from the display window and in open communication with the through bore;

a filtering lens transmissive to UV radiation mounted on one end of the main body and a screw plug on the opposing end of the main body, wherein an enclosure is disposed behind the screw plug defining a battery chamber;

a longitudinally extended printed circuit board disposed in the through bore, the printed circuit board having (a) a light detection circuit including a light detector disposed adjacent one longitudinal end of the printed circuit board and beneath the filtering lens, (b) a power circuit having a first output connected to the light detection circuit and a second output, the power circuit including a push-button switch mounted on the printed circuit board and extending through the through opening of the main body, and (c) an output conversion circuit connected to the first output of the power circuit and having an input terminal connected to the light detector;

a plurality of batteries housed in the battery chamber behind the screw plug and electrically connected to the power circuit to provide an operating voltage to the first output for powering the output conversion circuit and the light detection circuit responsive to operation of the push-button switch; and, a display module mounted in said display window and having a plurality of display segments arranged to present a graphical display, one of said plurality of display segments being connected to the second output of the power circuit for energization thereof responsive to the operation of the push-button switch, a remaining portion of the plurality of display segments being connected to the output conversion circuit for respective energization thereof responsive to detection of predetermined levels of UV radiation.

2. A portable UV detector with simple operation as claimed in claim 1, wherein the power circuit includes a resistor having one end coupled to the first output and an opposing end connected to the second output, and a Zener diode having one end connected to the second output and an opposing end coupled to a reference terminal.

3. A portable UV detector with simple operation as claimed in claim 2, wherein the light detection circuit includes a plurality of resistors forming a voltage divider circuit connected in series with the light detector, the voltage divider having voltage tapping junction for output of a reference voltage;

the output conversion circuit including a comparator circuit formed by a plurality of comparators, wherein a reference voltage terminal of each respective comparator is connected to the voltage tapping junction, each comparator having an input terminal connected to a resistor of a different resistance value, and output terminal respectively connected to a pin corresponding to the remaining portion of the plurality of display segments of the display module.

* * * * *